United States Patent [19]

Powell

[11] 4,088,115

[45] May 9, 1978

[54] SOLAR HEATING SYSTEM

[76] Inventor: Charles E. Powell, 15510 Tonekai Rd., Apt. F, Apple Valley, Calif. 92037

[21] Appl. No.: 715,711

[22] Filed: Aug. 19, 1976

[51] Int. Cl.² .................................................. F24J 3/02
[52] U.S. Cl. ..................................... 126/270; 237/1 A
[58] Field of Search ................ 126/270, 271; 237/1 A

[56] References Cited

U.S. PATENT DOCUMENTS

| 3,894,685 | 7/1975 | Keyes et al. | 237/1 A |
|---|---|---|---|
| 4,018,212 | 4/1977 | Barr | 126/271 |
| 4,030,477 | 6/1977 | Smith | 126/270 |

*Primary Examiner*—Kenneth W. Sprague
*Attorney, Agent, or Firm*—Fred N. Schwend

[57] ABSTRACT

A solar heating system including a large number of nested thin wall cylindrical collector-convertors disposed in vertical positions and housed within an insulated housing having a window therein to allow light rays from the sun to strike the collectors at any of different angles regardless of the latitude or altitude of the sun. Ultraviolet and other shorter wave length rays are converted into heat upon striking the inner surfaces of the collectors to heat the walls thereof, and infra-red and other longer wave length rays are absorbed by coatings on the collectors to likewise heat the walls thereof. Those rays which are reflected strike the opposite collector wall surfaces to again be converted to heat. The collectors are of such length as to enable multiple reflections under practically all conditions. Air to be heated is passed lengthwise along the outer wall surfaces of the collectors to pick up the heat therefrom and is then passed to a heat storage device under certain temperature conditions where it is stored for future use.

The heat storage device is constructed of stacked cement plates having labyrinth passages therein through which the heated air is passed to heat the concrete. Air for heating a building or the like is passed through other labyrinth passages within the heat storage device to absorb heat therefrom.

An automatically controlled valve system controls the passage of heated air between the collector-converter housing, the heat storage device and a building structure to be heated in different manners depending upon the relative temperature conditions existing within the building, the collector-convertor unit and the heat storage device.

11 Claims, 22 Drawing Figures

SOLAR HEATING SYSTEM

BACKGROUND OF THE INVENTION

1. Field of the Invention

This invention relates to a solar heating system and has particular reference to a system for collecting and converting the sun's rays to heat and to transfer such heat to a building or like structure.

2. Description of the Prior Art

Heretofore, solar heating systems have generally utilized so called "flat plate" collectors comprising a heat absorbent plate within an enclosure formed partly by a transparent window which allows the sun's rays to pass through the enclosure and to strike the plate. Air, or other heat absorbing fluid, is passed through the enclosure and along the plate to transfer heat thereto from the plate.

In order to increase the efficiency of such systems, recent developments have comprised the addition of heat absorbing bodies such as shredded material or partitions within the flat plate enclosure to increase the area exposed to the sun. The U.S. Pat. No. 3,946,720 issued to J. H. Keyes et al. discloses an example of this type.

Ideally, collectors of the above flat plate type should track the sun as it passes across the horizon to maintain the greatest thermal efficiency throughout the day. However, because of the cost and complexities encountered in moving such a collector, it is generally set in a stationary position at such an angle that it will be perpendicular to the sun at about 1300 hours, solar time. Obviously, the efficiency of such a collector falls off considerably as the sun moves away from such perpendicular position. Also, much of the heat from a flat plate collector is radiated outwardly through the window, further reducing its efficiency so that, at best, such collectors are generally considerably less than 50% efficient.

SUMMARY OF THE INVENTION

A principal object of the present invention is to greatly increase the efficiency of a solar heating system for buildings or the like.

Another object is to provide a solar heating system capable of deriving heat from the sun during periods of cloudy or overcast days as well as during sunny days.

Another object is to reduce the size and cost of a solar heating system.

Another object is to provide a solar heating system which will maintain a relatively high degree of efficiency throughout a large portion of the daylight hours.

Another object is to provide a solar heating system capable of collecting and converting to heat all of the sun's rays ranging from ultraviolet to infra red.

Another object is to provide an improved heat storage device for a solar heating system.

Another object is to provide a heat storage device for a solar heating system which may be readily expanded or contracted to meet the heat storage needs of buildings or other structures of different sizes or heat demands.

A further object is to provide an improved control system for controlling the transfer of heat between a solar heat collector, a heat storage device and a building or the like to be heated.

According to the present invention, a solar heat collector-convertor unit is provided comprising an enclosure having a panel of heat insulating material over which is mounted a large number of nested thin walled cylindrical collector-convertor members which are formed of metal, preferably aluminum. Such members have a length-to-diameter ratio of from 2:1 to 3½:1 and are covered with a thin black selective coating. The enclosure is mounted in a substantially horizontal position with the collector-convertor members extending vertically, and a transparent window forming part of the enclosure is spaced from the upper ends of the collector-convertor members, permitting rays from the sun to strike the walls of the members.

Accordingly, practically regardless of the position of the sun in altitude and at all times of the day, the sun's rays will strike the inner wall surfaces of the members at an angle. The ultraviolet and other short wave length rays will pass through the outer coating and most will be converted into heat to heat the walls of the members. The infra red and other longer wave length rays will be absorbed by the coating to also heat the walls. Those rays which are reflected will strike an opposite wall surface of the member and again, the main body thereof will be converted to heat. This will continue until substantially all of the sun's rays have been converted to heat. Heat radiated from any surface will be absorbed, at least partly, by an opposite wall.

By forming the end walls of the collector-convertor members in a convex or otherwise non-planar form, substantially none of the surfaces of the members face outward and therefore only a minute amount of heat, if any, will be radiated outwardly through the window.

According to another aspect of the invention, the heat insulating panel of the collector-convertor unit is provided with relatively small holes therethrough, such holes being located intermediate the outer sides of adjacent ones of the various collector-convertor members. Air is forced between the window and the tops of the members, causing the same to turbulate and to flow downwardly along the lengths of the members through such holes to a collector manifold chamber below the panel. As the turbulent air moves along the outer surfaces of the members, it picks up heat therefrom. Since the air is turbulent as it passes along the members, any tendency toward laminar flow is eliminated and since the air is under pressure because of the restrictive size of the holes in the panel, a high degree of heat transfer occurs.

Air from the collector manifold chamber is automatically transferred through conduit means to either a heat storage unit or directly to the building or is recirculated within the collector-convertor unit or is transferred from the heat storage unit to the building, all depending upon the temperature conditions existing in different parts of the system.

The heat storage unit is of modular design comprising a plurality of stacked plates of concrete or the like having aligned holes therein arranged to form a plurality of labyrinth passages for uniformly absorbing heat from the heated air and transferring such heat to other labyrinth passages in which air to be heated is passed for conveyance to the building or other structure to be heated. The volumetric content of the heat storage unit may be readily varied in accordance with the heat storage requirements by varying the number of plates within the stack.

BRIEF DESCRIPTION OF THE DRAWINGS

The manner in which the above and other objects of the invention are accomplished will be readily understood on reference to the following specification when read in conjunction with the accompanying drawings, wherein.

DESCRIPTION OF THE PREFERRED EMBODIMENT

Figures 1, 2:
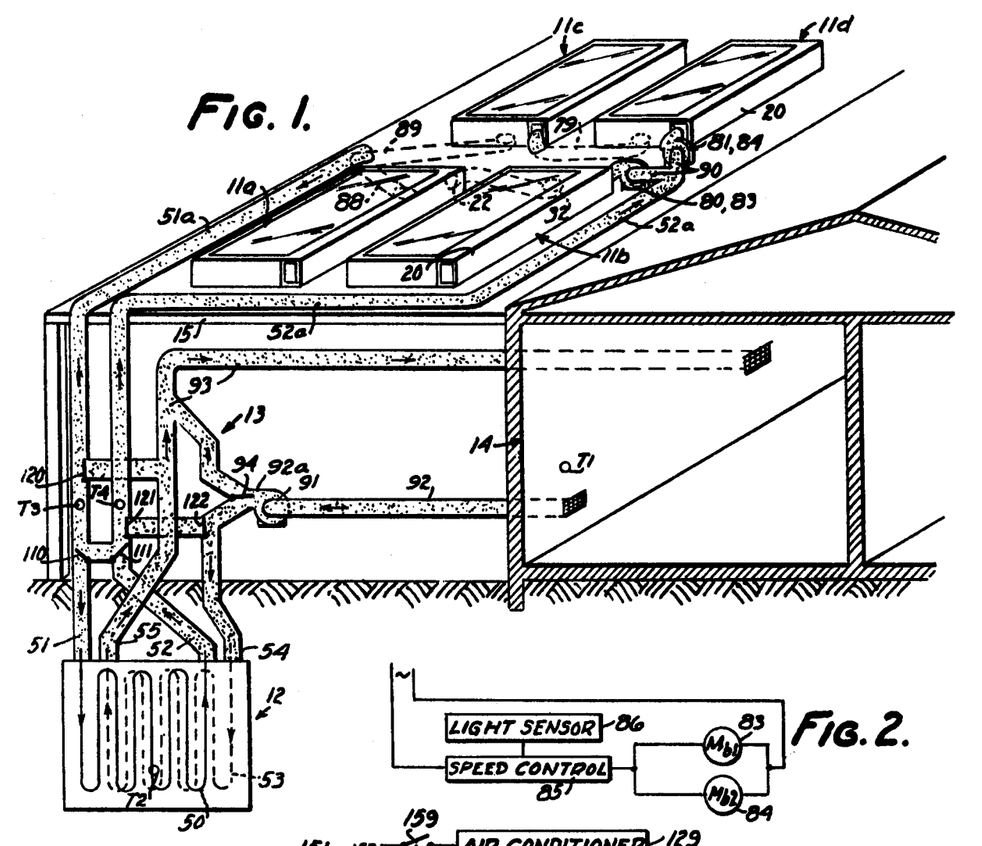
FIG. 1 is a schematic perspective view of a solar heating system embodying a preferred form of the present invention.
FIG. 2 is a schematic wiring diagram of the control circuit for the blower motors for circulating air through the collector-convertor units.

Referring in particular to FIG. 1, the solar heating system, in general, comprises a heat collecting device 11 including a series of collector-convertor units 11a, 11b, 11c, and 11d, a heat storage unit 12 and a valve control system 13 for controlling the flow of air between the above elements and the interior of a building 14 in accordance with different temperature conditions and requirements.

COLLECTOR-CONVERTOR UNITS

Describing now the construction of the collector-convertor units 11a to 11d, such units are of similar construction but may vary in number depending upon the maximum heat required for the building 14. Although the units 11a, etc., are illustrated as being mounted in elevated horizontal positions on a roof structure 15 adjoining the building 14, they may alternately be mounted on the ground or on a separate structure spaced from the building. Also, if the roof of building 14 were horizontal, the units 11, etc., could be mounted thereon.

As shown in FIGS. 1 and 4 to 9, each collector-convertor unit comprises a base 16 formed of two layers 16a and 16b of heat insulating material, such as compressed fiberglass, rigid polyurethane foam or the like. Side and end walls 17 and 18, respectively, also formed of insulating material surround the base 16 forming part of the enclosure for the collector-convertor unit. An inlet manifold 20 of rectangular cross section is formed of sheet metal which is fitted along one of the side walls 17 and is covered by a top member 21 also of two layers of insulating material.

A flanged inlet fitting 22 (FIG. 9) is connected to one end of the manifold 20 and partly fits within the manifold. A sealing ring 24 fitted within a groove in the fitting 23 provides a hermetic seal and screws 25 secure the flanged portion of the fitting to walls surrounding the end of the manifold 20.

Figure 9:
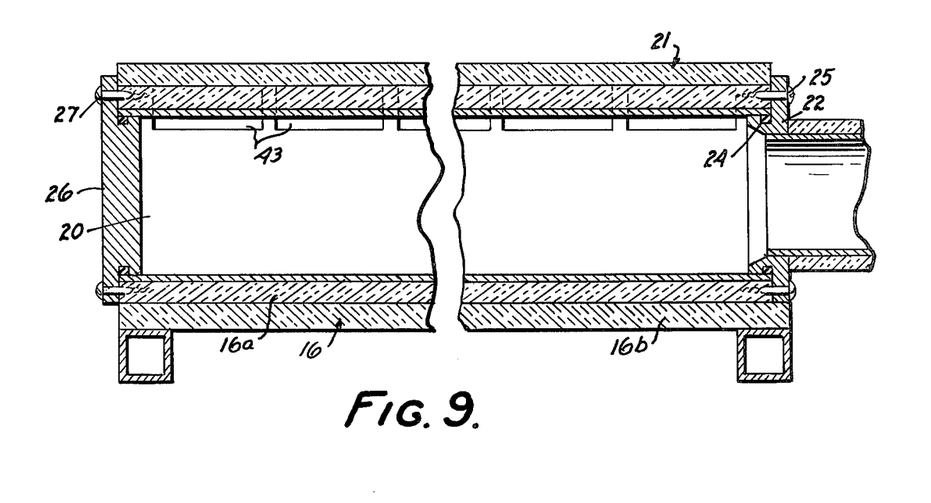
FIG. 9 is a sectional view through the inlet manifold of one of the collector-convertor units and is taken along the line 9—9 of FIG. 4.

The opposite end of the manifold 20 is closed by a flanged cap 26 which is secured by screws 27 to the walls surrounding the manifold 20. Since both ends of the manifold 20 are alike, the fitting 23 and the cap 26 may be interchanged to facilitate any desired grouping of the collector-convertor units.

Figure 4:
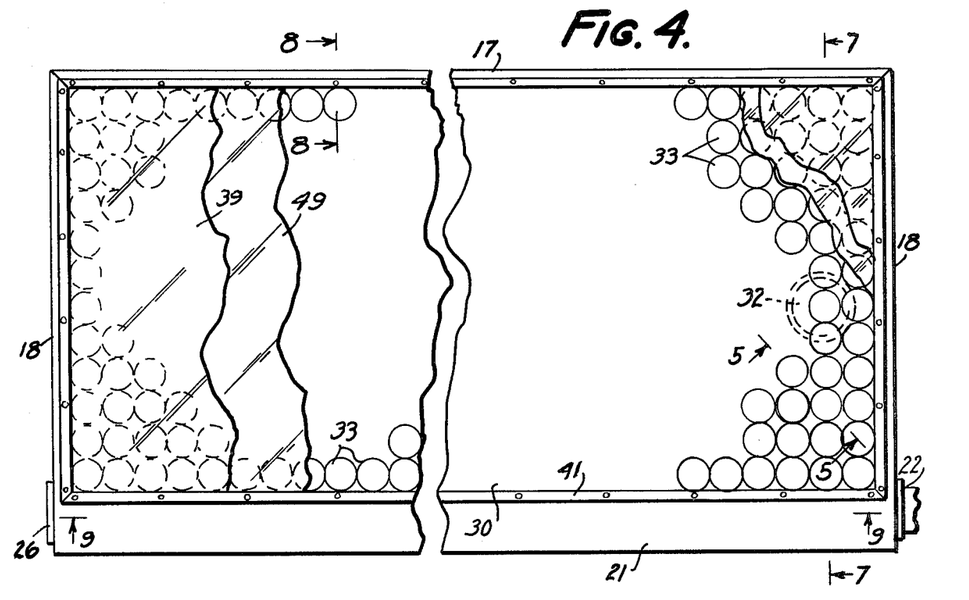
FIG. 4 is a plan view, partly broken away, of one of the collector-convertor units.
Figure 5:
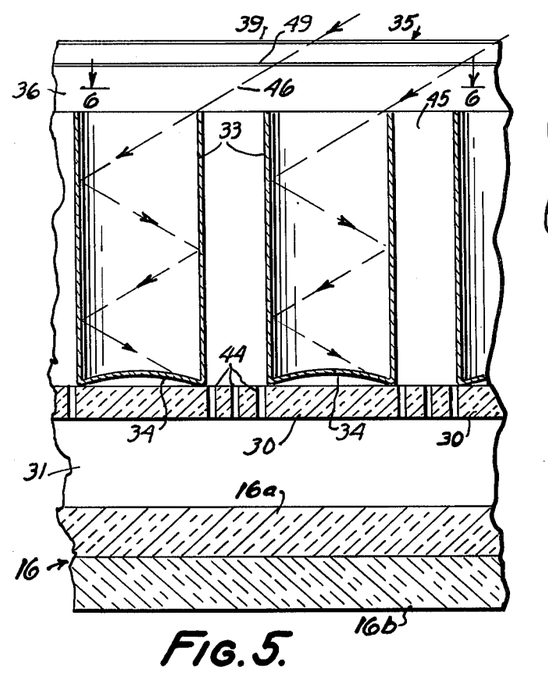
FIG. 5 is an enlarged sectional view taken along line 5—5 of FIG. 4.
Figure 7:
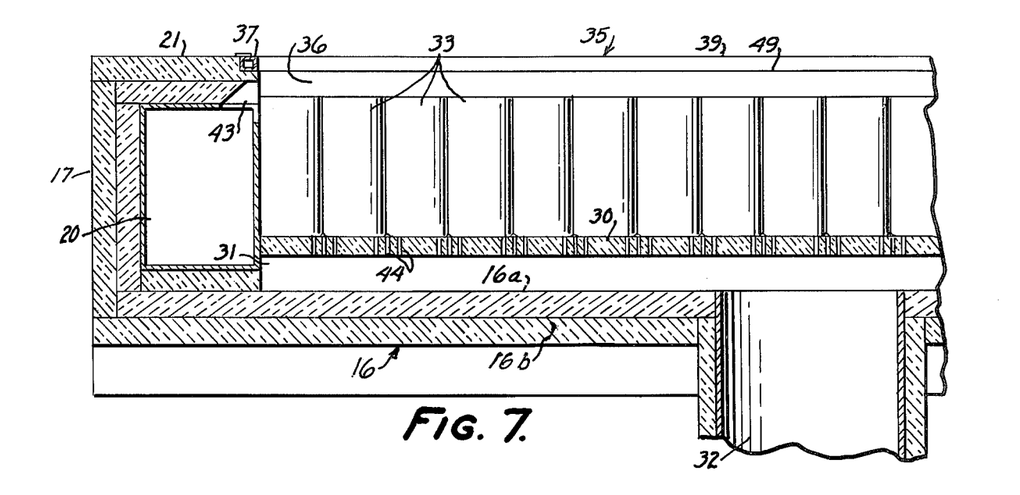
FIG. 7 is a transverse sectional view through one of the collector-convertor units and is taken along the line 7—7 of FIG. 4.
Figure 8:
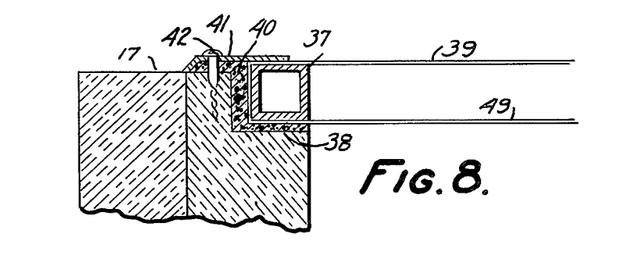
FIG. 8 is an enlarged fragmentary sectional view showing part of the window frame and is taken along the line 8—8 of FIG. 4.

As shown in FIGS. 4, 5 and 7, a panel 30 of heat insulating material, such as fiber board, is fitted within the side and end walls 17 and 18, respectfully, of the unit 11 and is suitably secured in spaced relation to the base 16 to form an outlet manifold chamber 31. An outlet conduit 32 opens into such chamber for removing heated air therefrom.

In accordance with the present invention, a plurality of cylindrical collector-convertor members 33 are nested within the walls 17, 18 and rest on the panel 30. Such members 33 are formed of thin aluminum, preferably on the order of 0.015 inches thick, and are closed at their lower ends by integrally formed upwardly convex end walls 34. The members 33 are black anodized or otherwise formed with a thin selective black coating on all surfaces thereof which will allow ultraviolet and other rays of shorter wave lengths from the sun to penetrate the same and to be converted into heat upon striking the metal walls of the members 33, thus heating the walls of such members. The coating will also absorb infra red and other longer wave length rays to likewise heat the walls of members 33.

It will be noted that the members 33 are at least twice as long as their diameters and may optimally be from 2 to 3½ times as long as their diameters.

A transparent window, generally indicated at 35, is fitted over the top opening between the side walls 17 and 18 and is located above the upper ends of the members 33 to form an air space 36. For this purpose, a rectangular metal frame 37 (FIGS. 4, 7 and 8) of rectangular cross section is fitted within notched portions 38 formed in the side walls 17 and 18. Two relatively thin sheets of transparent plastic 39 and 49, preferably polyvinyl flouride, are stretched over the top and bottom edges of the frame 37, leaving a heat insulated space therebetween. Such plastic sheets 39 and 49 may be bonded together at their outer edges or may be bonded to the frame 37. The frame 37 is set in a soft mastic 40 and is held in place by a retainer strip 41 secured to the upper edges of walls 17 and 18 by screws 42.

As seen in FIGS. 7 and 9 in particular, openings 43 are formed along the length of the manifold 20 and top wall 21 to communicate the interior of the manifold 20 with the air space 36, permitting the air to flow uniformly over the tops of the various members 33.

Figure 6:
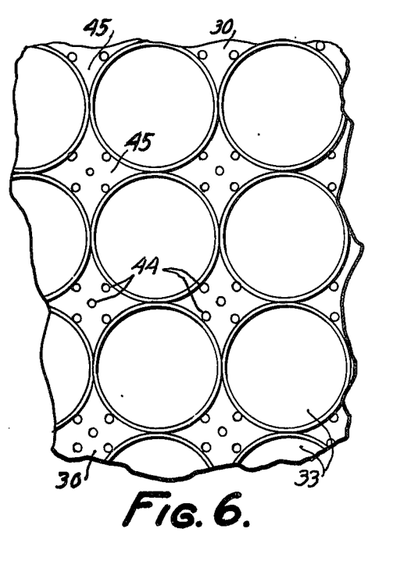
FIG. 6 is a sectional plan view taken along line 6—6 of FIG. 5.

Relatively small holes 44, FIGS. 5, 6 and 7, are formed through the insulating panel 30 to communicate the spaces 45 between the outside surfaces of adjacent members 33 with the outlet manifold chamber 31.

In operation, since the collector-convertor unit is in a horizontal position, the sun's rays passing through the window 35 at an angle of, for example, 35° as indicated by the arrows 46, FIG. 5, will mainly strike the inner surfaces of the members 33. The longer wave length waves will be predominately absorbed by the coating on the members and some will be reflected to the opposite inner sides of the members. Likewise, the shorter wave length rays will pass through the coating and be predominately absorbed by the inner side walls of the members 33 and some will be reflected. This continued absorption and reflection will continue until the rays are substantially completely absorbed to heat the walls of the members.

Since the bottom walls 34 of the members 33 are convex, substantially all of the sun's rays which might strike the same either directly or from reflection will be reflected off to the side walls and substantially none will be reflected outwardly through the window 35. Likewise, any heat radiated by the inside or outside surfaces of the members 33 will strike an opposite surface of the same or an adjacent member 33 and practically none will be radiated back through the window 35 into space since heat will radiate only in a direction normal to the radiating surface.

It will be seen from the above that in most latitudes and at most times during daylight hours, the sun's ray will be reflected several times between the inner surfaces of the members 33 to collect a maximum amount of solar energy. In fact, at higher latitudes and in early morning and late afternoon when the sun's rays are attenuated mostly because of the greater distances they must travel through the earth's atmosphere, a greater number of reflections will take place to insure maximum collection of solar energy even under those conditions. On the other hand, in order to obtain a greater number of reflections in lower latitudes, approaching 0° latitude, it may be desirable to tilt the collector-convertor units slightly away from the perpendicular and away from the sun's path to obtain a large number of reflections, particularly during midday.

The upper surface of the insulating panel 30 is preferably coated with a white substance so that practically no heat will be radiated outward therefrom.

Air to be heated is admitted under pressure through the manifold 20 to the space 36 above the members 33. As it passes through the collector-convertor unit it will be turbulated by engagement with the relatively sharp upper edges of the various members 33 and will then pass downwardly along the outer surfaces of such members, picking up heat along the entire lengths thereof. Thereafter, such heated air will pass downwardly through the holes 44 in panel 30 and into the outlet manifold chamber 31. The holes 44 preferably comprise only approximately 2 percent of the total area of the panel 30 so that they form a restriction to retard the flow of air through the panel. Thus, the air within the unit 11 is compressed to force the same into intimate contact with the members 33 throughout their lengths to better remove the heat therefrom. Since any laminar flow of the air is prevented by virtue of the turbulence thereof as it passes over the edges of the members 33, the air will remove essentially all heat contained in the walls of such members. Also, due to such compression, the air will be uniformly distributed throughout the space 36.

HEAT STORAGE UNIT

Describing now the heat storage unit 12, it should be noted that the latter has two series of labyrinth passages, one separated from the other. The first series is depicted schematically in FIG. 1 by solid serpentine lines 50 connected to conduits 51 and 52 to carry air to and from the unit 12 to heat the same. A second series of labyrinth passages is depicted by the dotted serpentine line 53 which is connected to conduits 54 and 55 for conveying air to be heated by the unit 12 to and from the same.

Referring to FIGS. 10 to 16, the heat storage unit 12 comprises a stack of horizontally extending plates 56 formed of heat absorbing and retaining concrete and layed on top of one another, the stack being preferably located under ground. As seen in FIGS. 10, 11, 14 and 16, each of the plates 56 has a series of holes 57 extending therethrough which are regularly spaced in orthogonal directions and combined to form vertically extending spaced passages extending through the entire stack. Additional plates 58 and 59, also of concrete, are located at the top and bottom of the stack and have return end grooves 60 and 61, respectively, formed therein which bridge across adjacent pairs of the passages in one direction to form a series of parallel passageways 62 and 63 of serpentine form. The entire stack rests on a base plate 159 also of concrete and a moisture proof cover of plastic or the like (not shown) is preferably placed over the stack.

Figure 10:
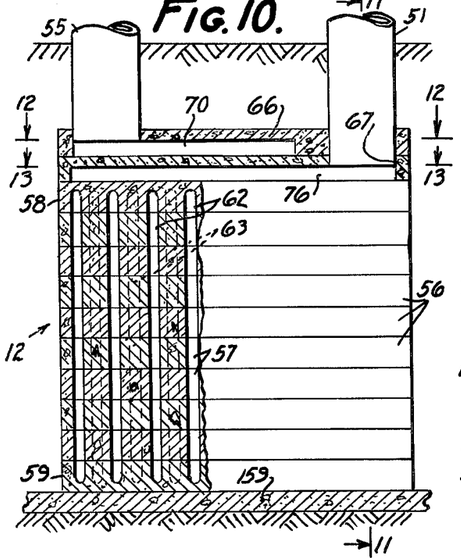
FIG. 10 is a front view, partly in section, of the heat storage unit and is taken substantially along line 10—10 of FIG. 11.
Figure 11:
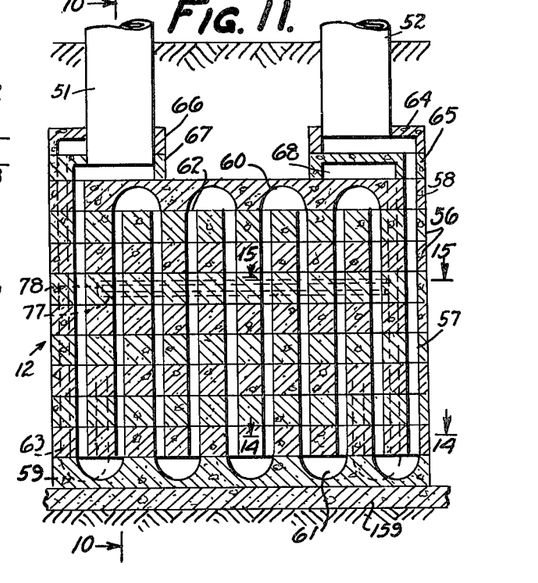
FIG. 11 is a side sectional view taken along line 11—11 of FIG. 10.
Figure 14:
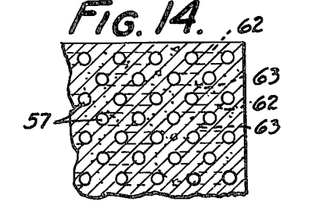
FIG. 14 is fragmentary sectional plan view through one of the heat storage plates and is taken along line 14—14 of FIG. 11.
Figure 15:
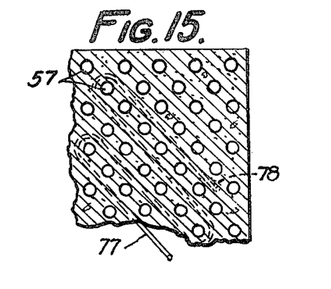
FIG. 15 is a fragmentary sectional plan view taken along line 15—15 of FIG. 11.

It will be noted, as seen particularly in FIGS. 10 and 14, that the various passageways 62 and 63 are located in two separated groups corresponding to the schematic representations 50 and 53, respectively, in FIG. 1. That is, one group 62 is located in alternate parallel planes and the other group 63 is located in alternate parallel planes interspersed with but separated from group 62. Also, as seen in FIG. 11, the passageways 62 are staggered relative to the passageways 63.

Figure 12:
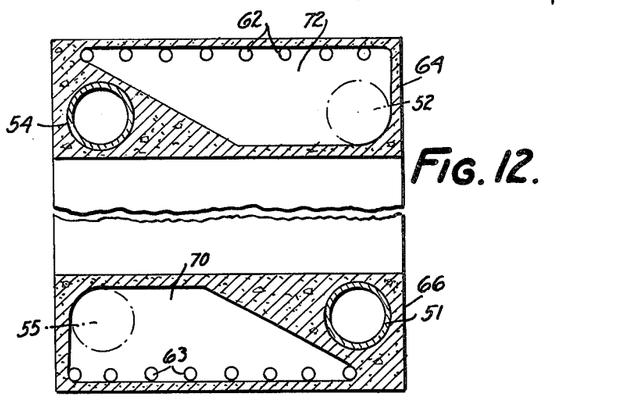
FIG. 12 is a sectional plan view through the upper manifold plates and is taken along line 12—12 of FIG. 10.
Figure 13:
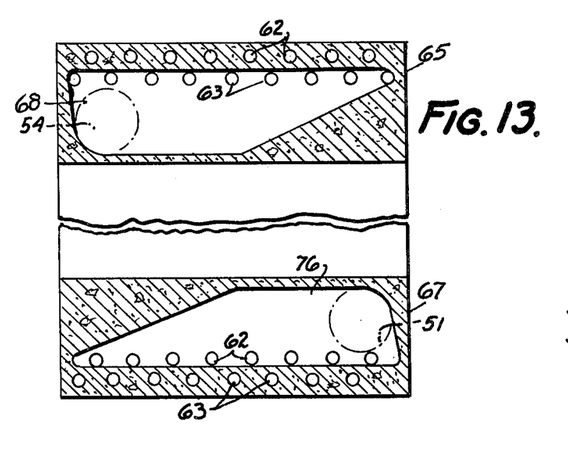
FIG. 13 is a sectional plan view through the lower manifold plates and is taken along line 13—13 of FIG. 10.

Manifold plates 64, 65, 66 and 67, also of concrete, are provided to connect the inlets of respective groups 62 and 63 of the passageways together and to also connect the outlets of such groups together and to respective ones of the conduits 51, 52, 54 and 55. The manifold plates are located in pairs as seen in FIGS. 11, 12 and 13. The lower plate 65 has a cavity 68 communicating the inlet ends of passageways 63 with the conduit 54. The other or outlet ends of the passageways 63 extend through manifold plate 67 and open into a cavity 70 formed in the upper manifold plate 66 to communicate the same with the conduit 55. On the other hand, upper manifold plate 64 has a cavity 72 which communicates the outlet ends of passageways 62 with the conduit 52. The manifold 67 has a cavity 76 therein which communicates the inlet ends of passageways 62 with the conduit 51.

Figure 16:
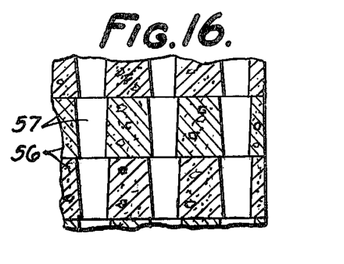
FIG. 16 is an enlarged fragmentary sectional view through certain of the air passages in the heat storage device.

As seen in FIG. 16, the various holes 57 in the plates 56 are tapered slightly to form an irregular passage. Therefore, as air is forced therethrough, either to heat the same or to remove heat from the storage unit, such air is turbulated to break up any laminar flow tendency in order to effect a high degree of heat transfer between the air and the plates 56.

The heat storage unit 12 may be utilized to supply heat for purposes other than heating the interior of the building 14. For this purpose, one or more of the plates 56 may have a copper or the like tubing 77, FIGS. 11 and 15, cast therein. The tubing is bent back upon itself as seen at 78 and is wound in a sinous manner through the plate to pass adjacent various ones of the holes 57. Fluid, such as water, is heated by passage through the tubing 77 and may be used to supply hot water within the building or to heat different appliances, etc.

AIR CIRCULATING APPARATUS

In order to circulate air through the collector-convertor units 11a to 11d, air blowers 80 and 81, FIG. 1, are provided at the inlets to the inlet manifolds 20 of the units 11b and 11d. Motors 83 and 84, see also FIG. 2, for respective ones of the blowers 80 and 81, are connected in circuit with a suitable speed control unit 85 which is controlled by a light senser 86 which senses the ambient outside light and causes the blowers 80 and 81 to force a quantity of air through the units 11b to 11d in proportion to the intensity of outside light. Thus, during nighttime hours, the motors 83 and 84 are at rest and no air is passed through the units 11b and 11d, while during midday on a cloudless day, a maximum amount of air is passed through the units.

As seen in FIG. 1, the outlet conduit 32 of collector-convertor unit 11b is connected to the inlet conduit fitting 22 of unit 11a and the outlet conduit, i.e. 32, of the latter is connected through a branch conduit 88 to a conduit 51a forming an upper extension of conduit 51. The units 11c and 11d are similarly connected together and to the conduit 51a through conduit 79 and branch conduit 89.

The inlets of the blowers 80 and 81 are connected through branch conduits 90 to a conduit 52a forming an upper extension of the conduit 52.

An additional motor driven blower 91 is provided to withdraw air from the interior of the building 14 through conduit 92, opening into the building, and to force the same through an outlet 92a into either the conduit 54 leading to the storage unit 12 to be heated or through a conduit 93, also opening into the building, to recirculate the same through the building or to force the air through both such conduits in different proportions depending on the setting of a variable position servo valve 94 which will be described later.

The blower 91 is preferably operated continuously but may be switched on and off under manual control through a conventional circuit, not shown.

VALVE SYSTEM

The valve system 13 is responsive to certain temperature conditions in different locations, as sensed by different temperature sensing devices T1 to T4, and is effective to appropriately direct the flow of air between the collector-convertor units 11a–11d, the heat storage unit 12 and the building 14 in accordance with the relative temperatures determined by such sensors. Sensor T1 senses the ambient temperature inside the building 14 at a location adjacent the air outlet conduit 92; sensor T2 senses the temperature in the heat storage unit 12; sensor T3 senses the temperature in the conduit 51a and sensor T4 senses the temperature in the conduit 52a.

The valve system 13 is shown schematically in FIG. 1 as being formed of separate conduits and valves for the sake of clarity and for understanding the function of the same. However, as seen in FIGS. 17 to 22, the valve system is actually consolidated into a single valve device to which the various conduits 51, 51a, 52, 52a, 54, 55, 92 and 93 are connected. The valve device comprises an elongate tubular member 95 which is square in cross section and is divided into four valve chambers 96, 97, 98 and 100 by intersecting divider walls 101 and 102. The walls of member 95 and the divider walls 101 and 102 are preferably formed of a heat insulating material to prevent transfer of heat therethrough. Also, the various conduits, i.e. 51 etc., are also suitably heat insulated for the same purpose.

Valve chamber 96 connects conduits 51 and 51a. Chamber 97 connects the conduits 52 and 52a. Chamber 98 connects the blower outlet 92a to either the conduit 54 at the lower end of the chamber or to conduit 93 at the upper end of the chamber or partially to both, depending on the position of the aforementioned servo valve 94. Chamber 100 connects conduit 55 to the upper end of chamber 98 and thus to conduit 93 through an opening 103 in the divider wall 102.

Figure 17:
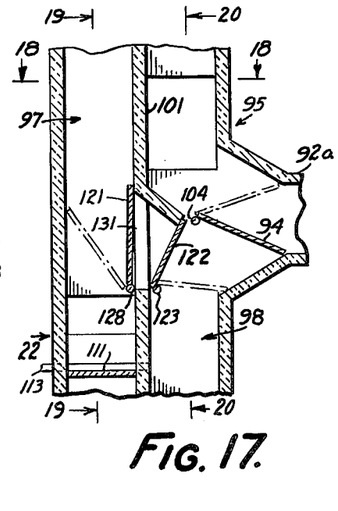
FIG. 17 is a sectional front view through the valve device embodying the servo, bypass and changeover valves, and is taken along line 17—17 of FIG. 18.
Figure 18:
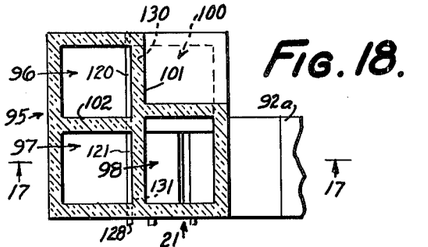
FIG. 18 is a sectional plan view of the valve device and is taken along line 18—18 of FIG. 17.

Servo valve 94 controls the amount of heat applied to the interior of the building 14 from either the heat storage unit 12 or directly from the collector-convertor units 11a–11d or causes recirculation of some or all of the air within the building, and for this purpose it is movable between its fully closed position shown in full lines in FIG. 17 and its fully open position shown in dot-dash lines or it is movable to any position immediate such extremes. Valve 94 is carried by a rockable shaft 104, see also FIG. 21, to which is attached an arm 105 and a worm gear sector 106, the latter meshing with a worm 107 driven by a reversible motor 108. Control of the motor 108 in response to temperature variations sensed by sensor T1 will be described subsequently.

Arcuately shaped bypass valves 110 and 111 are provided in the chambers 96 and 97, respectively, for the purpose of either recirculating the heated air within the collector-convertor units 11a–11d when the temperature of such air is lower than the temperature of the heat storage unit 12 or transferring such air between the storage unit 12 and the units 11a–11d when the temperature of such air in the units 11a–11d is higher than the temperature of the unit 12.

Figure 19:
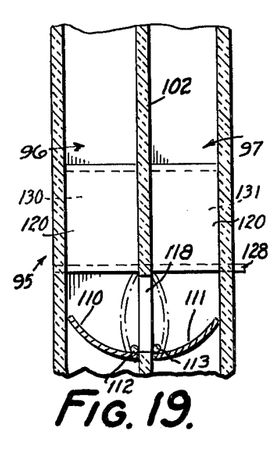
FIG. 19 is a sectional left hand side view of the valve device and is taken along line 19—19 of FIG. 17.
Figure 20:
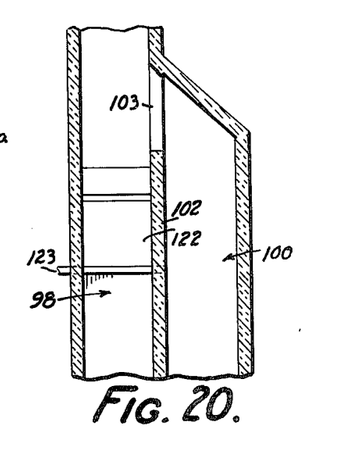
FIG. 20 is a sectional right hand side view of the valve device and is taken along the line 20—20 of FIG. 17.
Figure 22:
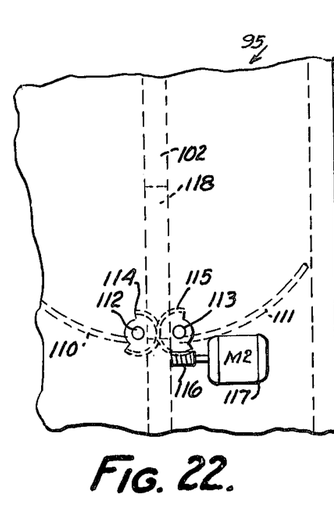
FIG. 22 is a left hand side view, with parts broken away of the valve device and is taken in the direction of the arrow 22 in FIG. 17.

Valves 110 and 111 are carried by respective rockable shafts 112 and 113, see also FIG. 22, for movement between closed positions shown in full lines in FIG. 19 and open positions shown by dot-dash lines. Intermeshing gear sectors 114 and 115 are secured to the shafts 112 and 113 respectively. Sector 115 also meshes with a worm 116 driven by a reversible motor 117. Control of the motor 117 in response to temperature differentials determined by sensors T2 and T3 will be described subsequently. However, it should be noted here that when the by-pass valves 110 and 111 are in their closed positions, air passing downwardly through the chamber 96 from the collector-convertor units 11a–11d will be deflected laterally through an opening 118 in the divider wall 102 and will be returned upwardly through the chamber 97 to recirculate through the units 11a–11d, thereby causing reheating of the air until its temperature rises above that of the storage unit 12 at which time the valves 110 and 111 are moved to their open positions, closing off the opening 118 and permitting the heated air to pass directly between the units 11a–11d and the storage unit 12 unless otherwise diverted by auxilliary servo valves 120 and 121, located in the chambers 96 and 97, respectively, and a changeover valve 122 located in the chamber 98.

Figure 21:
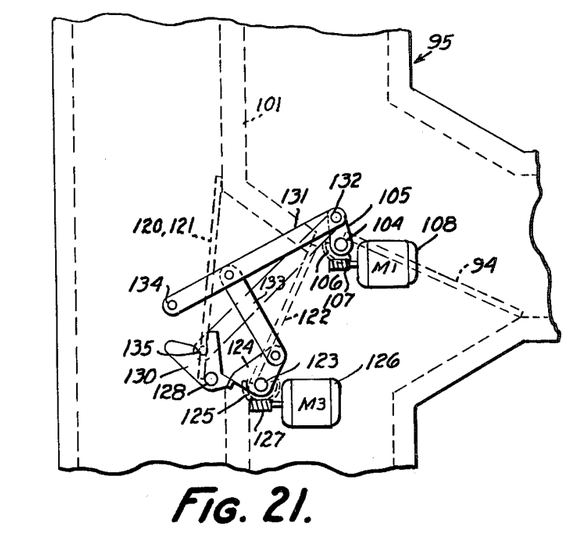
FIG. 21 is a front view, with parts broken away, of the valve device and is taken in the direction of the arrow 21 of FIG. 18.

Changeover valve 122 is carried by a rockable valve shaft 123, see also FIG. 21, to which an arm 124 and gear sector 125 are attached. Valve 122 is moved between its normal open position shown by full lines in FIG. 17 and its closed position shown by dot-dash lines by a reversible motor 126 which drives a worm 127 meshing with gear sector 125.

The auxilliary servo valves 120 and 121 are both mounted on a common rockable shaft 128 for movement between closed positions depicted in full lines in FIG. 17 or wherein they cover openings 130 and 131, respectively, in the divider wall 101 and open positions depicted by dot-dash lines in FIG. 17.

When the changeover valve 122 is its normal open position, the auxilliary valves 120 and 121 are held in their closed positions, and for this purpose, the arm 124 on valve shaft 123 overlies a control plate 130 attached to shaft 128 of the valves 120 and 122. However, when the changeover valve 122 is moved, clockwise to its closed position, the auxilliary servo valves 120 and 122 are constrained to move conjointly with the servo valve 94. For this purpose, a link 131 is pivotally connected at 132 to the arm 105 and is pivotally connected by a cross link 133 to the arm 124 on the changeover valve shaft 123. Normally, when the changeover valve 122 is open, the arm 124 causes link 133 to hold link 131 in its upper full-line illustrated position. However, when the changeover valve 122 is rocked clockwise to its closed position, the link 131 is lowered by link 133 to locate a pivot pin 134 thereon within a close fitting notch 135 in plate 130 to form a pivotal connection between the link 133 and plate 130, thereby coupling the auxilliary servo valves 120 and 122 to the servo valve 94. Thus, as the servo valve 94 is moved, for example, toward its open position, the auxilliary servo valves 120 and 124 will be correspondently and proportionally moved toward their open positions to transfer air between the building 14 and the collector-convertor units 11a–11d.

In cloudy or raining or otherwise inclement daytime weather or at certain times in the early morning and late evening when light energy from the sun is appreciably attenuated, the collector-convertor units 11a–11d may be effective to heat the air passing therethrough sufficiently to supply heat to the building 14 but not sufficiently to also heat the storage unit 12. In such case, it would be desirable to transfer at least the greater amount of heat derived from the units 11a–11d directly to the building 14. In this condition, as determined by temperature sensor T4, the changeover valve 122 will be moved fully to its closed position. Accordingly, air from the building 14 passing through conduit 92, will be directed, at least in part, by the servo valve 94 to pass over the now closed changeover valve 122, through opening 131, and upwardly over now opened auxilliary servo valve 121 into chamber 97 from whence it is conducted through conduit 52a to the collector-convertor units 11a–11d. Heated air from the units 11a–11d, on the other hand, will be transferred from the conduit 51a to chamber 96 and then deflected laterally by the now opened auxilliary servo valve 120 through the opening 130 in divider wall 101 into chamber 100 to be conducted upwardly through chamber 98 and into conduit 93 and, therefore, into the building 14. The control of valve 122 in response to temperatures determined by sensor T4 will be described hereafter.

TEMPERATURE SENSING AND VALVE CONTROL SYSTEM

Figure 3:
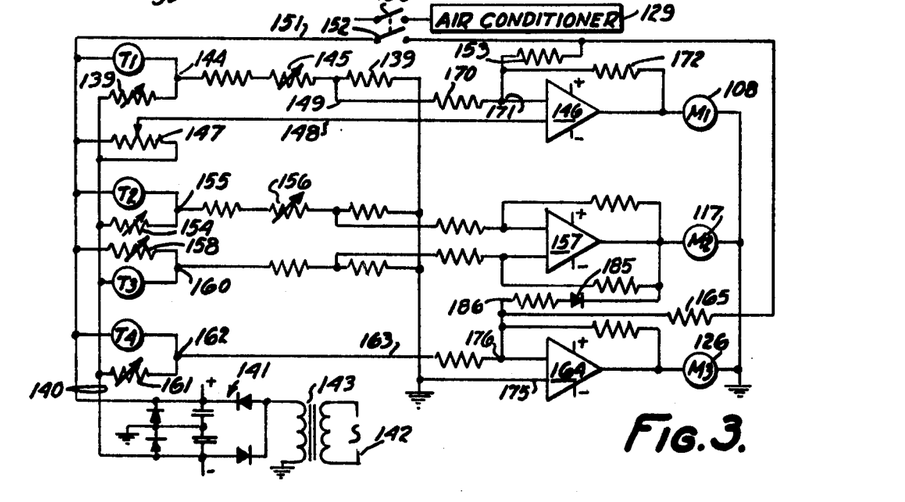
FIG. 3 is a schematic wiring diagram of the valve control circuits for controlling air flow between the collector-convertor units, the heat storage device and the building.

As mentioned heretofore, the various valves of the system are controlled in accordance with temperatures occurring in different locations, as determined by the various sensors T1 to T4, FIGS. 1 and 3. Such sensors are preferably thermistors or the like whose electrical resistance vary with the temperature of the environment in which they are located. Also, the system is intended to be operated in conjunction with a conventional air conditioning or cooling system generally indicated at 129.

For the purpose of controlling the aforementioned servo valve 94, the sensor T1, located within the building 14 and adjacent the opening of conduit 92, is connected in a bridge circuit with a variable resistor 139 across a DC power supply circuit 140, the latter being connected to a rectifier circuit 141 of conventional construction which derives energy from a source 142 of alternating current through a transformer 143. Junction 144 between sensor T1 and resistor 140 is connected through a variable calibrating resistor 145 and line 149 to the inverting input of an operational amplifier 146, the output of which is connected to the servo valve operating motor 108. A load resistor 139, connected to ground, applies voltage through resistor 170 to junction 171 at the input of amplifier 146. A feedback resistor 172 across the input and output of amplifier 146 cooperates with the resistor 170 to restrict the speed of the motor so that it appreciably lags any changes in temperature sensed by sensor T1.

A variable potentiometer 147 is connected across the supply circuit 140 and its adjustable contact is connected through line 148 to the non-inverting input of amplifier 146 for the purpose of adjustably controlling the temperature of the air within the building. When the temperature within the building drops below that corresponding to which the potentiometer 147 is set, a control voltage will be applied to the amplifier 146, causing the motor 108 to move the servo valve 94 towards its open position to direct a greater amount of heated air into the building from the storage unit 12 or from the collector-convertor units 11a–11d, depending on the position of the changeover valve 122.

When the building temperature rises above that by the potentiometer 147, the motor 108 will be reversed to move the servo valve 94 towards its closed position so that a greater amount of air passing through conduit 92 will be recirculated through the upper portion of chamber 98 and conduit 93.

The servo valve 94 will be closed when the air conditioning or cooling system 129 is operating. For this purpose, a line 151 having a normally open switch 152 therein is connected between the positive side of the power supply line 140 and a resistor 153 connected to the junction 171 of the inverting input of amplifier 146. Switch 152 is mechanically connected to a switch 159 for energizing the air conditioner 129. According, when the switch 149 is closed to cause operation of the air conditioning or cooling system 129, the switch 152 will also be closed to apply a biasing potential over line 151 to cause the servo valve motor 108 to completely close the servo valve 94.

For the purpose of controlling the bypass valves 110 and 111, sensor T2, located in the heat storage unit 12, is connected in a bridge circuit with a variable resistor 154 across the power supply circuit 140. The juncture 155 between sensor T2 and resistor 154 is connected through an adjustable calibrating resistor 156 to the inverting input of a second operational amplifier 157, whose output is connected to the motor 117 for the bypass valves 110 and 111. The resistor 154 is preferably adjusted to provide a zero potential at the juncture 155 when the sensor T2 senses a temperature of 0° C.

The sensor T3 which senses the temperature of the air in the conduit 51a is connected in a bridge circuit with a variable resistor 158 across the supply circuit 140 and the juncture 160 is connected through line 161 to the non-inverting input of the amplifier 157. It will be noted that the input circuits to amplifier 157 from the sensors T2 and T3 oppose each other. Therefore, if the temperature of the heat storage unit 12 is higher than the temperature of the air in the conduit 51a, the motor 117 will be energized to close the bypass valves 110 and 111 but if the temperature of the unit 12 is lower than the temperature of the air in the conduit 51a, the motor 117 opens the valves 110 and 111.

For the purpose of controlling the changeover valve 122, the sensor T4, located in the conduit 52a, is connected in a bridge circuit with a variable resistor 161 across the power circuit 140. The resistor 161 is preferably adjusted to provide the same resistance as the sensor T4 when the temperature of the air in conduit 52a exceeds a selected changeover temperature. This is preferably set to be somewhat above the comfort zone temperature, i.e., approximately 86°.

Physically, the sensors T1 and T4 are preferably mounted in the chambers 96 and 97, respectively, of the valve member 95. The juncture 162 between sensor T4 and resistor 161 is connected by line 163 to the inverting input of a third operational amplifier 164 whose output is connected to the changeover valve motor 126. The non-inverting input 175 of valve amplifier 164 is grounded so that when the air temperature in the conduit 52a drops below the changeover temperature, the motor 126 will be activated to fully close the changeover valve 122 and when the temperature in the conduit exceeds such changeover temperature, the motor 126 will be reversed to open the changeover valve.

It will be noted that line 151 is also connected through a resistor 165 to the junction 176 of the inverting input of amplifier 164 so that when the switch 152 is closed during the operation of the air conditioning or cooling system a positive biasing potential will also be applied to amplifier 164 to cause motor 126 to close the changeover valve 122 so that all of the air from the building 14 will be recirculated through the chamber 98 and conduit 93.

Means are further provided to cause closing of the changeover valve 122 when the bypass valves 110 and 111 are moved to open position and this purpose, a circuit, including diode 185 and resistor 186 in series, is connected between the output of amplifier 157 and the junction 176 of the non-inverting input to amplifier 164. Thus, when a signal is applied to cause the bypass motor 117 to open the bypass valves 110 and 111, the inverting input of amplifier 164 is driven negative to cause the motor 126 to drive changeover valve 122 to closed position.

Describing now a typical operation of the system, during nighttime hours, heat would normally be stored in the heat storage unit 12. Sensors T2 and T3 would determine that the temperature of the heat storage unit would be higher than the temperature of the air in the collector-convertor units 11a–11d, causing the bypass valves 110 and 111 to be closed. Since the temperature of the air in conduit 52a would now normally below the changeover temperature, i.e. 86°, the changeover valve 122 would be open. Accordingly, as sensor T1 senses a drop in temperature within the building 14 below that to which resistor 147 is set, the motor 108 will be actuated to move the servo valve 94 toward its open position, causing a greater amount of air from the inside of the building to be directed downwardly through the chamber 98 and conduit 54 to the storage unit 12 to be heated thereby. The heated return air is passed upwardly through conduit 55 and chamber 100 and is then directed upwardly through the chamber 98 and conduit 93 to be returned to the building.

During early morning hours, or during cloudy or raining daytime periods, as the ambient outside light increases to raise the temperature of the air be recirculated through units 11a–11b above the changeover temperature, but before the point is reached wherein the temperature of such air exceeds the temperature of heat storage unit 12, the sensor T4 causes amplifier 164 to control motor 126 to set the changeover valve 122 in closed condition. The auxilliary servo valves 120 and 121 will accordingly be coupled to the servo valve 94 to that they are moved to at least partially open positions. Therefore, air passing from the interior of the building will be directed through the changeover valve 122 and auxilliary servo valve 121, upwardly through chamber 97 to be directly heated by the units 11a–11d. The heated air is then returned into chamber 96 where it is deflected into chamber 100 by the auxilliary servo valve 120 and from whence it passes through the upper end of chamber 98 and conduit 93 to be returned to the building.

As the temperature of the air being circulated through the units 11a–11d further increases to a point where it exceeds the temperature of the storage 12, the changeover valve 122 is opened and the sensors T2 and T3 control amplifier 157 to cause motor 117 to open the bypass valves 110 and 111 so that the air heated by the units 11a–11d is directly transferred from such units to the heat storage unit 12 to store heat therein. At the same time, sensor T1 controls the amplifier 146 to cause motor 108 to adjust the position of the servo valve 94 so that an appropriate amount of air is transferred from the storage unit 12 to the building to maintain the desired temperature therein.

It will be obvious to those skilled in the art that many variations may be made in the exact structure shown without departing from the spirit and scope of this invention.

I claim:

1. A solar heat collecting device comprising
   a panel,
   a plurality of nested hollow cylindrical solar heat collector-convertor members supported over said panel with the axes of said members extending perpendicular to said panel,
   said panel having openings therethrough at locations intermediate said members,
   a transparent pane extending over said members and spaced therefrom to form a space,
   enclosure means extending between said panel and said pane to enclose said space, and
   means for passing air to be heated into said space, along said members and outwardly through said openings.

2. A solar heat collecting device as defined in claim 1 wherein said members are closed at the ends thereof adjacent said panel.

3. A solar heat collecting device as defined in claim 1 wherein said panel is formed of a heat insulating material.

4. A solar heat collecting device as defined in claim 1 wherein said panel is disposed at least substantially horizontally.

5. A solar heat collecting device as defined in claim 1 wherein said members are formed of heat conducting material coated with a heat absorbing material.

6. A solar heat collecting device as defined in claim 1 wherein said members are formed of aluminum having a black coating on at least the inside surfaces thereof.

7. A solar heat collecting device as defined in claim 1 comprising
   means forming an enclosure for the side of said panel opposite said members, and
   means for conveying heated air from said enclosure.

8. A solar heat collecting device as defined in claim 1 wherein each of said members has a length from 2 to $3\frac{1}{2}$ times the diameter thereof.

9. A solar heat collecting device as defined in claim 1 comprising
   means forming a non-planar closure for each of said members adjacent said panel.

10. A solar heat collecting device as defined in claim 1 wherein said members are disposed at least substantially vertically and wherein said air passing means forces said air under pressure downwardly along the sides of said members whereby to absorb heat from said members.

11. A solar heat collecting device as defined in claim 1 wherein said openings restrict the flow of said air therethrough whereby to increase the pressure of air within said space above normal.

* * * * *